Oct. 28, 1930.  A. WINTER  1,779,896
SCREW COMPOSED OF SEVERAL PARTS
Filed Aug. 14, 1929

Inventor:
Alois Winter

Patented Oct. 28, 1930

1,779,896

UNITED STATES PATENT OFFICE

ALOIS WINTER, OF SCHOBRITZ, NEAR AUSSIG, CZECHOSLOVAKIA

SCREW COMPOSED OF SEVERAL PARTS

Application filed August 14, 1929, Serial No. 385,753, and in Germany May 31, 1929.

The present invention relates to a screw nut which is composed of several parts and which is prevented from becoming loose when in use.

Figure 1:
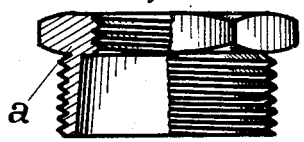
Figure 2:
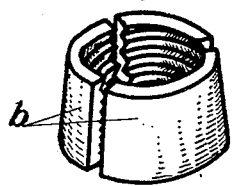
Figure 4:
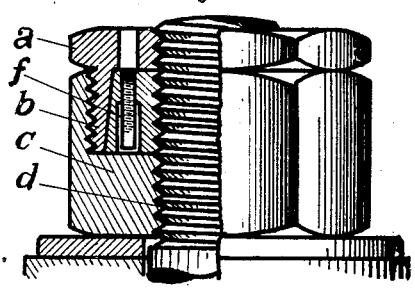
Figure 3:
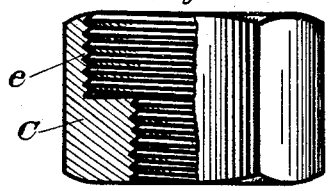
Figure 5:
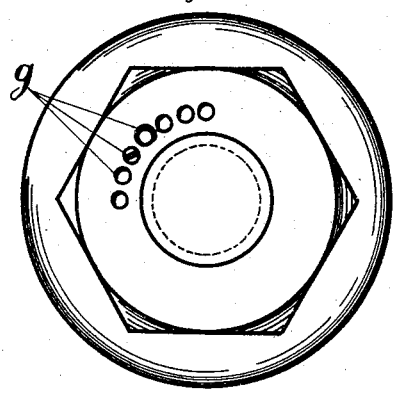

An example of the invention is shown in the Figures 1-5 of the accompanying drawing.

$a$ (Figure 1) is the top portion of the nut,
$b$ (Figure 2) are threaded gripping sections of conical shape, whilst
$c$ (Figure 3) is the lower nut portion or the base nut.
$d$ (Figure 4) is a longitudinal section showing the fixing of the parts of the nut.
$e$ (Figure 5) is a plan view of the nut.

First the base nut $c$ is screwed on, then the thread gripping sections $b$ are inserted in an inner cavity $e$ of the same and are so laid round the bolt $d$, that their threads engage with the threads thereof, whereupon the top nut portion $a$ is screwed in the threaded enlargement $e$ (Figure 3) of the base nut and at the same time screwed on the bolt $d$ with its inner thread. The top nut portion $a$ is also hollowed out conically and when screwed down on the gripping sections $c$ it presses them firmly into the thread of the bolt (Figure 4) and at the same time all parts are tightly forced into or against each other thus producing a powerfully increased friction which makes a loosening of the screw impossible.

Further locking is ensured by arranging in one of the threaded sections, a pin $f$, screw adjusted (Figure 4) and by providing corresponding holes $g$ in the top nut portion. The screwed pin has a slot adapted to be engaged by a screw driver through the holes so that the pin might be turned. When the top nut portion is tightened up until one of the holes therein comes over the pin, the latter is turned by a screwdriver until its head passes into the hole.

Thus a mutual displacement of the parts with respect to each other is prevented.

What is claimed is:

1. A screw nut characterized in this, that it is formed of several parts namely a base portion ($c$) having a threaded recess ($e$) a top portion ($a$) having an internal conical cavity and screwing into said threaded recess ($e$) upon being screwed on to the bolt ($d$) and internally threaded, externally conical gripping sections ($b$) which are placed inside said recess and around the thread of the bolt ($d$), said sections being encompassed by the top nut portion and entering into a wedge-like engagement therewith.

2. A nut according to claim 1, characterized in this, that one of said conical sections ($b$) contains a screwed locking pin ($f$) adapted to engage in a corresponding aperture in the top portion ($a$).

In testimony whereof I affix my signature.

ALOIS WINTER.